(12) United States Patent
Fan et al.

(10) Patent No.: US 6,704,693 B1
(45) Date of Patent: Mar. 9, 2004

(54) APPARATUS AND METHOD FOR STRUCTURAL ANALYSIS

(75) Inventors: Zhi Liang Fan, Mount Waverley (AU); Rong Zheng, Forest Hill (AU); Hua Gang Yu, Bulleen (AU); Peter Kenneth Kennedy, Ithaca, NY (US)

(73) Assignee: Moldflow PTY LTD, Kilsyth (AU)

( * ) Notice: Subject to any disclaimer, the term of this patent is extended or adjusted under 35 U.S.C. 154(b) by 704 days.

(21) Appl. No.: 09/688,093

(22) Filed: Oct. 16, 2000

Related U.S. Application Data (60) Provisional application No. 60/159,552, filed on Oct. 15, 1999.

(51) Int. Cl.[7] .............................................. G06F 17/50
(52) U.S. Cl. .................................. 703/1; 703/7; 700/98
(58) Field of Search ....................... 703/1, 2, 7; 700/97, 700/98; 708/446, 306; 345/419

(56) References Cited

U.S. PATENT DOCUMENTS

| | | | | |
|---|---|---|---|---|
| 5,604,891 A | * | 2/1997 | Burnett et al. .................. | 703/2 |
| 5,785,201 A | * | 7/1998 | Bordner et al. ............. | 220/231 |
| 5,920,491 A | * | 7/1999 | Hibbitt et al. .................. | 703/7 |
| 6,044,210 A | * | 3/2000 | Nagtegaal ...................... | 716/9 |
| 6,295,464 B1 | * | 9/2001 | Metaxas ...................... | 600/407 |

OTHER PUBLICATIONS

Patent Abstracts of Japan, Pub. No. 10–011472, Jan. 16, 1998 (Tokyo Gas Co. Ltd).
Patent Abstracts of Japan, Pub. No. 10–128817, May 19, 1998 (Matsushita Electric Works Ltd).

* cited by examiner

Primary Examiner—Albert W. Paladini
(74) Attorney, Agent, or Firm—Larson & Taylor PLC (57) ABSTRACT

The present invention provides a method and apparatus for analyzing the structural response of an object having an outer surface comprising a plurality of surface portions, the method including: forming a three dimensional model of said object, said model comprising a surface mesh representative of said outer surface and comprising a plurality of eccentric shell elements, wherein each of said elements is defined by a plurality of nodes on said surface and each of said nodes has one or more degrees of freedom; assigning to each of said elements a thickness indicative of half of the thickness of said object at said respective element; defining, for each of said elements, a reference surface that includes the nodes of said respective element and that is coincident with said surface mesh at said respective element; for a pair of opposed portions of said surface, establishing a constraining relationship between said degrees of freedom of each of said nodes on the first of said opposed portions and said degrees of freedom of one or more of the nodes on the second of said opposed portions; performing a finite element structural analysis of said object; and outputting one or more results of said structural analysis.

24 Claims, 8 Drawing Sheets

APPARATUS AND METHOD FOR STRUCTURAL ANALYSIS

This application claims the benefit of U.S. Provisional Application No. 60/159,552, filed on Oct. 15, 1999.

TECHNICAL FIELD

The invention relates to a method and apparatus for the structural analysis of components, of particular but by no means exclusive application in determining the deformation and stress distribution within an object that is subject to loads, especially in the analysis of injection molded parts to determine their deformation and stress levels under external or internal loading.

This invention is of most particular application in the structural analysis of thin walled structures, the most important geometric feature of which is that one dimension, the thickness, is at least several times smaller than the other two dimensions. Examples of such structures are injection-molded parts of metal, ceramic or polymeric material, metal castings, and structures formed from sheet metal.

BACKGROUND

Manufacturers of components and parts, in particular by injection molding, prefer to move structural analysis of the parts upstream in the design process in order to reduce design costs and time-to-market. In order to satisfy the demands of design engineers, existing products integrate finite element analysis (FEA) and Computer Aided Drafting (CAD). Pro-Engineer (trade mark), CATIA (trade mark), I-DEAS (trade mark), Solid Works (trade mark) and Solid Edge (trade mark) brand solid modelling packages are commonly used in mechanical design and drafting. These packages may be used to generate three dimensional, photo-realistic descriptions (known as 'solid models') of the component geometry. At present, the structural analysis packages directly based on solid models use solid elements such as tetrahedra and hexahedra.

For structural analysis of solid models, the region defined by the solid model is divided into a plurality of small elements called solid elements. This process is called meshing and the resulting collection of solid elements is called a solid mesh. Solid elements are usually simple geometric solids such as tetrahedra or hexahedra. Generation of the solid mesh has been improved in recent years though for complex parts, it is rarely automatic. Frequently the user will need to remove features from the solid model to allow the mesh to be generated successfully. This can be very time consuming and in extreme cases may necessitate remodelling of the component or some region of the component.

The use of solid elements has no theoretical advantage over the use of shell elements for thin walled structures, at least in determining the structural response of the component under load. However, the majority of component modelling is done in solid modelling systems, so the use of solid elements is more natural and allows a better interface between the geometric solid model and the mesh used for analysis. A particular problem arises with components that are thin walled. In this case, to achieve accurate results, it has been necessary to ensure that there are several well-shaped solid elements in the thickness direction. This leads to a large number of elements in the model and hence long computing times and large memory requirements. While it may be possible to use a higher order element to reduce the number of elements through the thickness, the automatic generation of such a mesh is still difficult. To reduce the size of large solid element models, the user may increase the characteristic element dimension and remesh the geometry. The automatic mesh generator will then generate fewer elements but the resulting finite element mesh may not be able to model the real stress distribution, owing to too few elements. Moreover a solid element mesh with an insufficient number of elements through the thickness has other problems, such as ill-conditioned stiffness matrix, shear locking and poor simulation of pure-bending and bending-dominated structural response. These can seriously affect the reliability of finite element analysis.

Thin walled structures typically consist of plate and shell components. There exist several classical theories for plates and shells. Particularly well-known are the Kirchhoff theory and Mindlin-Reissner theory. In the Kirchhoff theory, it is assumed that normals to the mid-surface before deformation remain straight and normal to the mid-surface after deformation. The Mindlin-Reissner theory employs the hypothesis that normals to the mid-surfaces before deformation remain straight but not necessarily normal to the plate after deformation. The stress normal to the midsurface is disregarded in both theories. Many kinds of plate and shell elements have been established based on the different plate and shell theories over the past 35 years. These permit accurate finite element analysis of thin walled structures but require a model which must be derived from the solid geometry in the CAD system. A shell element model for analysis consists of a lattice of planar or curved shell elements. Generally the shape of the elements are of simple geometric shape such as triangles or quadrilaterals. The element thickness is not explicitly shown on the element, though it is a property of the element. A shell element model may be generated from a solid geometry by forming a mesh of shell elements on the imaginary surface lying between the outer walls of the solid model. This surface is frequently called the mid-plane surface of the solid model. It is not possible to define the mid-plane surface automatically in all cases, so the generation of a shell element model is frequently a laborious task involving the construction of a separate model for analysis.

Thus, the solid element approach to the structural analysis of a thin walled. component has the advantage of easy interfacing to the solid geometry, while the shell element approach has the advantages of good structural performance, low compute times, low memory requirements and ease of mesh generation. However, the solid element approach has the disadvantages of difficult mesh generation, high element number, long compute times, high memory requirements and poor results if insufficient elements through thickness for low order elements, while with the shell element approach it is difficult to derive a mid-plane for creating a shell mesh.

Existing boundary element methods permit structural analysis of components by using a mesh generated on the surface of the solid geometry, but traditional boundary element methods require that the material be isotropic and linear. Boundary element methods also lead to large unbanded systems of equations, the solution of which requires large amounts of memory.

As described above, the shell element is appropriate for the structural analysis of (generally thin walled) structures if the mid-plane model is available. Well-established plate-shell theories are used in the shell element so that the number of dimensions is reduced sensibly from three to two, i.e. from a solid to a surface. On the other hand, it is desirable to directly use the solid model from a CAD package for finite element analysis.

Figure 1:
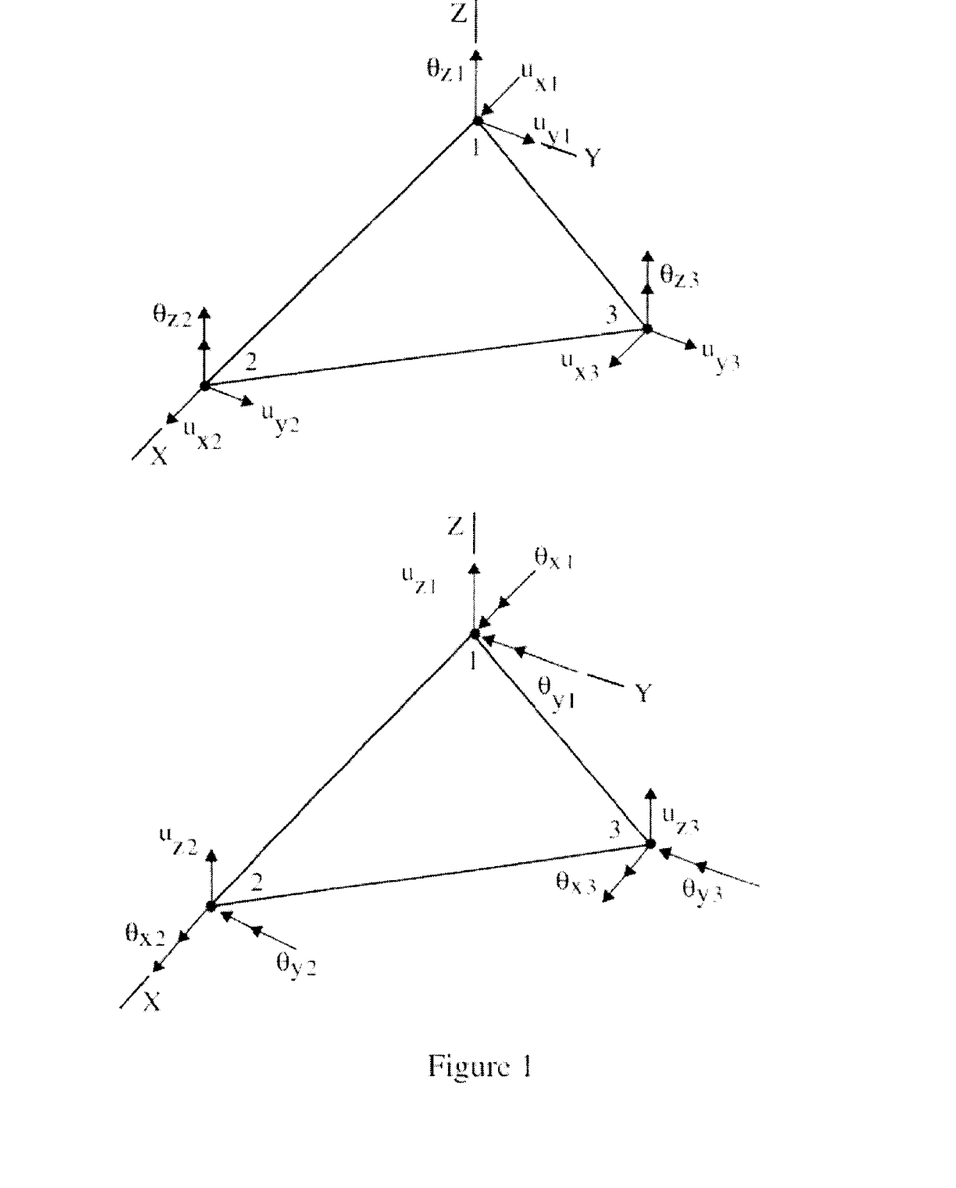
FIG. 1 is a depiction of an exemplary triangular shell element of the prior art with a defined local coordinate system.
Figure 2:
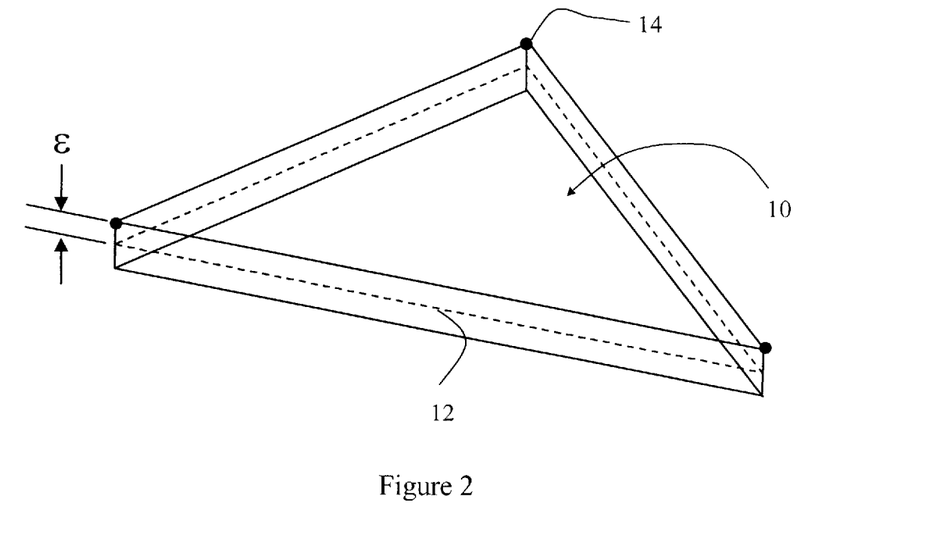
FIG. 2 depicts an eccentric shell element of the prior art, in which the element reference surface is not on the mid-surface.

Such shell elements are generally triangular or quadrilateral in shape, and may be planar or curved. At each node there are 5 or 6 degrees of freedom (dof). The degrees of freedom, in the most general case, comprise three translations and three rotations. FIG. 1 shows a triangular shell element which has a local coordinate system attached to it; the degrees of freedom are referenced to this coordinate system. Translational degrees of freedom for node n (n=1,2 or 3) in the local x, y and z directions are denoted by $u_{xn}$, $u_{yn}$ and $u_{zn}$ respectively. Similarly rotations about the local x, y and z axes are denoted by $\theta_{xn}$, $\theta_{yn}$ and $\theta_{zn}$ respectively. The surface through the element on which the nodes are located is called the reference surface. Usually a shell element is formulated with the midsurface as the reference surface. If the element reference surface is not on the midsurface, the element is said to be an eccentric shell element, with the distance by which the reference surface is displaced from the midsurface termed the eccentricity, $\epsilon$ (see FIG. 2), in which is also indicated the reference surface 10, the midsurface 12 and nodes 14). The formulation for an eccentric shell element can be established by extending the formulation of the normal shell element. The relationship between either the strains on the midsurface and reference surface or the degrees of freedom of nodes on the midsurface and reference surface can be used for extension from the formulations of normal shell elements to the formulations of eccentric shell elements.

Figure 3A:
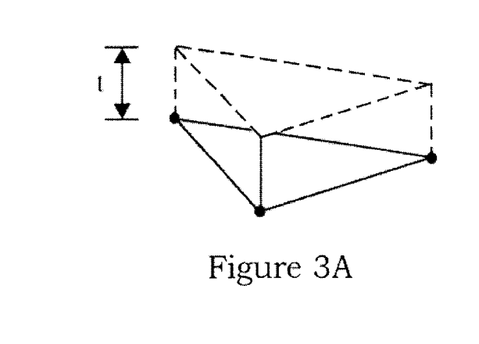
FIGS. 3A, 3B and 3C each show a planar triangular shell element of the prior art of thickness t with the reference surface placed at one of three possible locations.
Figure 3B:
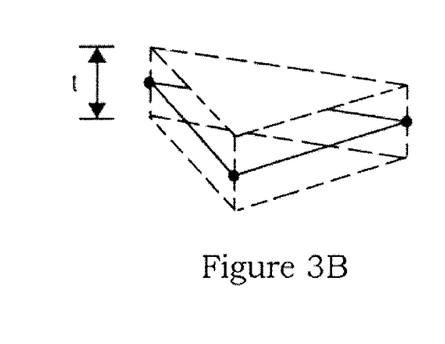
Figure 3C:
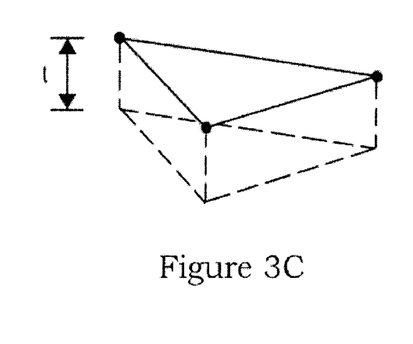

FIGS. 3A, 3B and 3C show three planar triangular shell elements of thickness t with the reference surface placed at three possible locations: the bottom, midsurface and top of the element respectively. In these figures, • again denotes node position.

It is an object of the present invention to address the limitations of using solid and shell elements for the structural analysis of thin walled structures while retaining at least some of the advantages of shell elements for thin walled structures.

SUMMARY OF THE INVENTION

According to the present invention, therefore, there is provided a method for analysing the structural response of an object having an outer surface comprising a plurality of surface portions, involving:

forming a three dimensional model of said object, said model comprising a surface mesh representative of said outer surface and comprising a plurality of eccentric shell elements, wherein each of said elements is defined by a plurality of nodes on said surface and each of said nodes has one or more degrees of freedom;

assigning to each of said elements a thickness indicative of half of the thickness of said object at said respective element;

defining, for each of said elements, a reference surface that includes the nodes of said respective element and that is coincident with said surface mesh at said respective element;

for a pair of opposed portions of said surface, establishing a constraining relationship between said degrees of freedom of each of said nodes on the first of said opposed portions and said degrees of freedom of one or more of the nodes on the second of said opposed portions;

performing a finite element structural analysis of said object; and outputting one or more results of said structural analysis.

Thus, according to the invention the reference surfaces of the shells are offset and multipoint constraints (between nodes) are used and thicknesses assigned to ensure that the collection of elements on corresponding surface portions have the same structural characteristics as a mesh of shell elements located at the midplane of the solid model and having the local thickness of the solid model at that location. Performing the finite element structural analysis includes defining boundary conditions and external and/or internal loading. Thus, the present invention uses modified shell elements defined on the surface mesh to perform structural analysis of the solid component.

The results of the analysis may include data or images indicating the expected deformation and stress state of the object under some internal or external load.

The portions of the surface may not be planar.

Preferably, for each of said nodes of said first of said opposed portions, the method includes establishing a constraining relationship between said degrees of freedom of said node and the degrees of freedom of an opposite node, being that node on the second of said pair of opposed portions opposite said node, when said opposite node exists, or between said degrees of freedom of said node and said degrees of freedom of the nodes of an opposite element, being that element of said opposed portion opposite said node, when opposite node does not exist.

Portions of the surface may be classified as sheets or edges, and the elements accordingly as sheet elements or edge elements.

Preferably the thickness indicative of half of the thickness of said object is derived from the actual thickness of said object if it is possible to define such a thickness. Where it is not possible to define the thickness of said object, the thickness of said elements may be taken to be the thickness of adjacent elements, or proportional to the thickness of adjacent elements.

Thus, even where it may be impossible to define a meaningful thickness, such as at the edges of the object or at its ends, a thickness indicative of the thickness can still be defined.

Preferably the method includes selecting said pair of opposed portions to be those opposed portions of said surface of said object between which said object is thinnest.

Thus, the method is expected to provide optimal results for thin objects, in which case the constraining relationship is preferably defined between the nodes of the surface portions between which said object is generally thinnest.

The mesh may comprise a lattice of triangles, quadrilaterals or other simple shapes (including polygons), any of which may be planar or curved. Many of these shapes can be readily generated by CAD systems.

The structural analysis may be of the effects of internal stresses or loads induced in the object during its manufacture, in which case the structural analysis will be of the resulting deformation or warping of the object caused by these internal loads. Such deformation is referred to below as 'warpage'.

The method may create the surface mesh by creating or importing a stereolithography representation of the object. More preferably, the method may then include improving the stereolithography representation (such as by generating a finer mesh with smaller elements).

The present invention also provides an apparatus for analysing the structure of an object having an outer surface comprising a plurality of surface portions, having:

modelling means for forming a three dimensional model of said object, said model comprising a surface mesh representative of said outer surface and comprising a plurality of eccentric shell elements, wherein each of said elements is defined by a plurality of nodes on said surface and each of said nodes has one or more degrees of freedom;

means for assigning to each of said elements a thickness indicative of half of the thickness of said object at said respective element;

means for defining, for each of said elements, a reference surface that includes the nodes of said respective element and that is coincident with said surface mesh at said respective element;

constraining means for establishing, for a pair of opposed portions of said surface, a constraining relationship between said degrees of freedom of each of said nodes on the first of said opposed portions and said degrees of freedom of one or more of the nodes on the second of said opposed portions;

analysis means for performing a finite element structural analysis of said object; and outputting means for outputting one or more results of said structural analysis.

Each of these means may include computer program products or portions, and the apparatus preferably includes a computer for executing such computer program portions.

The results of the analysis may include data or images (in the form of, for example, printouts, displays or computer files) indicating the expected deformation and stress state of the object under some internal or external load.

Preferably said constraining means is operable, for each of said nodes of said first of said opposed portions, to establish a constraining relationship between said degrees of freedom of said node and the degrees of freedom of an opposite node, being that node on the second of said pair of opposed portions opposite said node, when said opposite node exists, or between said degrees of freedom of said node and said degrees of freedom of the nodes of an opposite element, being that element of said opposed portion opposite said node, when opposite node does not exist.

Preferably said means for assigning to each of said elements a thickness (i.e. indicative of half of the thickness of the object at the respective element) is operable to employ a thickness indicative of the total thickness of said object at said respective element the actual total thickness of said object if it is possible to define such a thickness, and—where it is not possible to define the thickness of said object—to assign to said elements a thickness equal to the thickness of adjacent elements, or proportional to the thickness of adjacent elements.

Thus, in calculating the thickness indicative of half of the thickness of the object, the apparatus preferably derives the half thickness from an actual total thickness, if possible.

Preferably the apparatus is configured to select as said pair of opposed portions those opposed portions of said surface of said object between which said object is thinnest.

The mesh may comprise a lattice of planar or curved triangles, quadrilaterals or other simple shapes. Many of these shapes can be readily generated by CAD systems.

The analysis means may be operable or configured to analyse the effects of internal stresses or loads induced in the object during its manufacture, in which case the structural analysis will be of the resulting deformation or warping of the object caused by these internal loads.

BRIEF DESCRIPTIONS OF THE DRAWINGS

A preferred embodiment will now be described, by way of example, with reference to the accompanying drawings, in which.

DETAILED DESCRIPTION OF THE INVENTION

A method for using a mesh of shell elements defined at the boundary of a three dimensional object to perform structural analysis on the three dimensional body, according to a preferred embodiment of the present invention, is described below.

Figure 4:
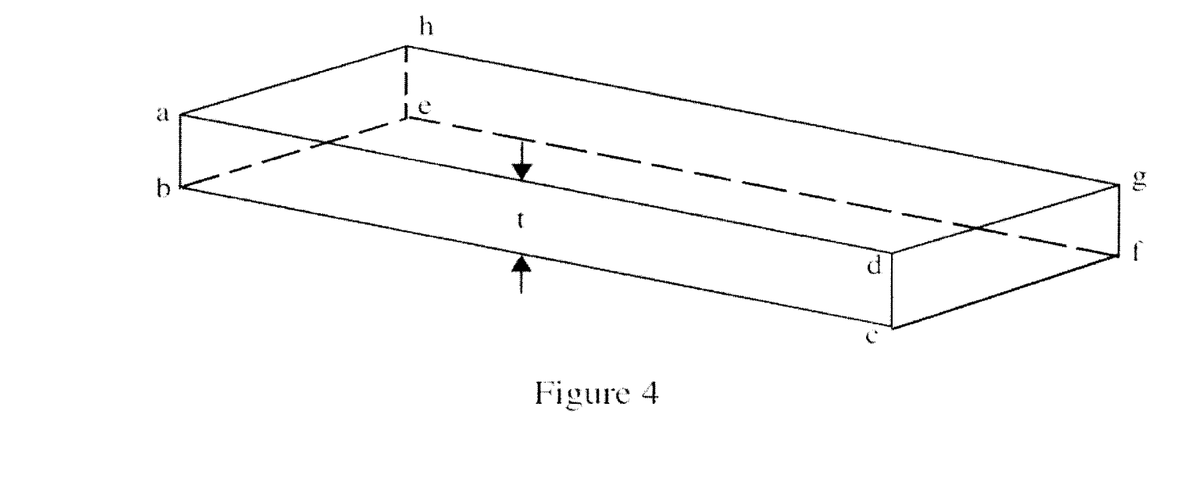
FIG. 4 is a view of a thin rectangular bar as an example of an object to be modelled.

In order to introduce a number of concepts, a thin rectangular bar of thickness t is depicted, by way of example, in FIG. 4. The structural response of the bar is represented by means of a shell model that is defined as the mesh on the exterior of the body. In FIG. 4, the mesh defining the rectangular bar is defined to be the set of quadrilateral shell elements defined by placing nodes at the vertices indicated as follows:

| Element No. | Definition by Vertices |
| --- | --- |
| 1 | adgh (the top of the bar) |
| 2 | bcfe (the bottom of the bar) |
| 3 | abeh (the left hand edge of the bar) |
| 4 | dcfg (the right hand edge of the bar) |
| 5 | abcd (the front edge of the bar) |
| 6 | efgh (the rear edge of the bar) |

For clarity, the edges (elements 3, 4, 5 and 6) are ignored for the present, but are discussed later; how the shell elements numbered 1 and 2 (representing the top and bottom of the bar) may be used to define the structural response of the bar will be described first.

Figure 5:
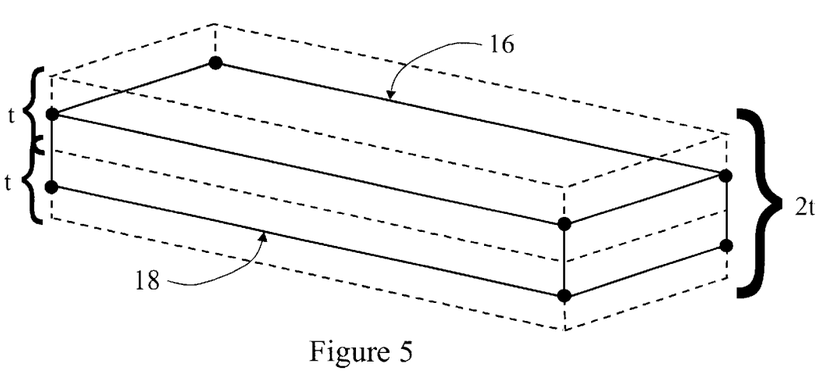
FIG. 5 is a view of the bar of FIG. 4 modelled with prior art, conventional shell elements.
Figure 6:
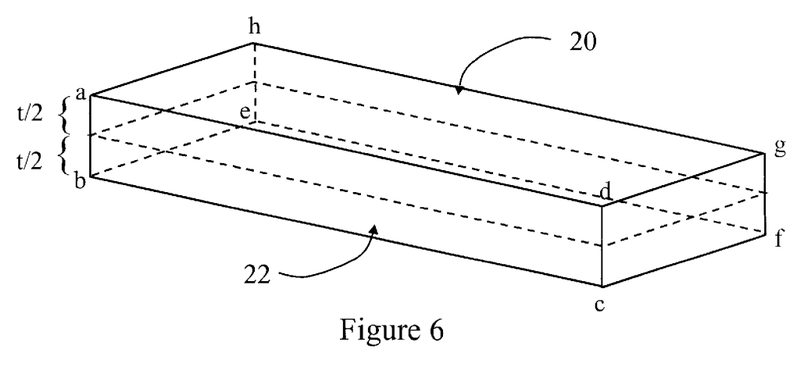
FIG. 6 is a view of the bar of FIG. 4 modelled with shell elements in a method according to a preferred embodiment of the present invention.

As an aside, it may be noted that, if conventional shell elements of thickness t were used for elements 1 and 2, with reference surfaces defined by nodes adgh and bcfe respectively, and the elements were regarded as bonded together to form a layered shell model, the resulting model would provide the response of a stiffer model, as the domain of the shell model would extend outside the bar (see FIG. 5, in which reference numeral 16 indicates the reference surface for element 1 and reference numeral 18 indicates the reference surface for element 2). In fact for the bar of thickness t, this shell element model would represent a bar of thickness 2 t. In order to get the correct structural response, according to the present invention a thickness of 0.5 t is ascribed to elements 1 and 2, and the reference surface 20 for element 1 is moved to the top of the bar (defined by nodes at adgh) and the reference surface 22 for element 2 to the bottom of the bar (defined by nodes bcfe) as shown in FIG. 6.

In the above discussion, the effect of edges was ignored: this will be dealt with below. The elements are regarded as bonded together. This is actually accomplished according to the invention by using multipoint constraints and will be discussed below in detail.

Figure 7:
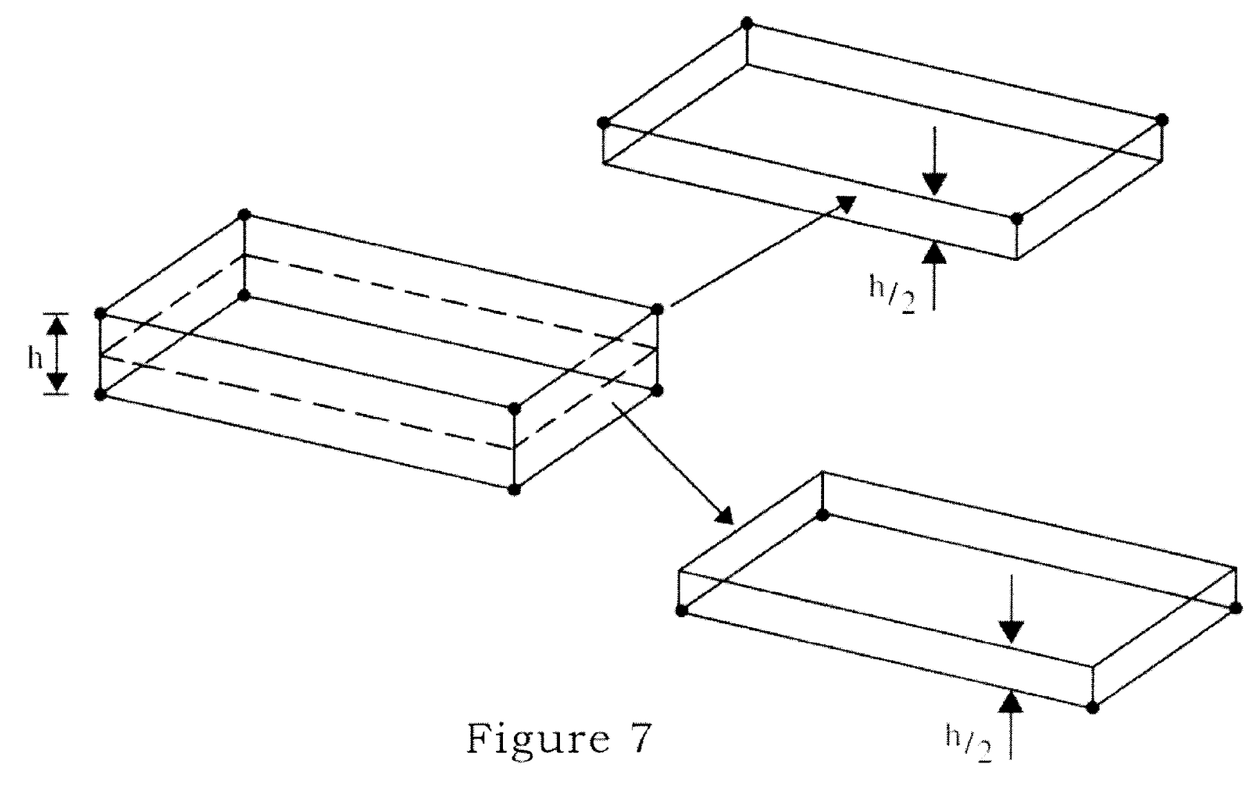
FIG. 7 is a view of a solid model of a simple plate-like object of thickness h, showing how it can be seen according to the present invention as the bonding of two plates each of thickness 0.5 h.

Furthermore, the simple case of the solid model of a flat plate is shown in FIG. 7. It appears double-skinned, having a top surface and a bottom surface. From the geometric point of view, the flat-plate can be seen as the bonding of two plates each of half thickness. The top plate is modelled using the eccentric shell element with the top surface as the reference surface, in which the plate assumptions are used. Similarly, the bottom plate is modelled using the eccentric shell element with the bottom surface as the reference surface. The bonding of the top and bottom plates may be regarded as stemming from the physical relationship between the deformation of the top surface and that of the bottom surface. This relationship is established using the assumptions of classical plate theories.

The preferred method of structural analysis according to the invention includes the following steps, each of which will be discussed in detail:

1. Creation of mesh on outer boundary;
2. Assignment of Thickness and Eccentricity: Matched and Unmatched Elements;
3. Matching of nodes to surfaces;
4. Establishment of constraint equations between degrees of freedom of a node n and degrees of freedom of its matching element e;
5. Specification of Internal and External Loading and Boundary Conditions; and
6. Perform Analysis and Improve Design.

Creation of Mesh on Outer Boundary

Figure 8:
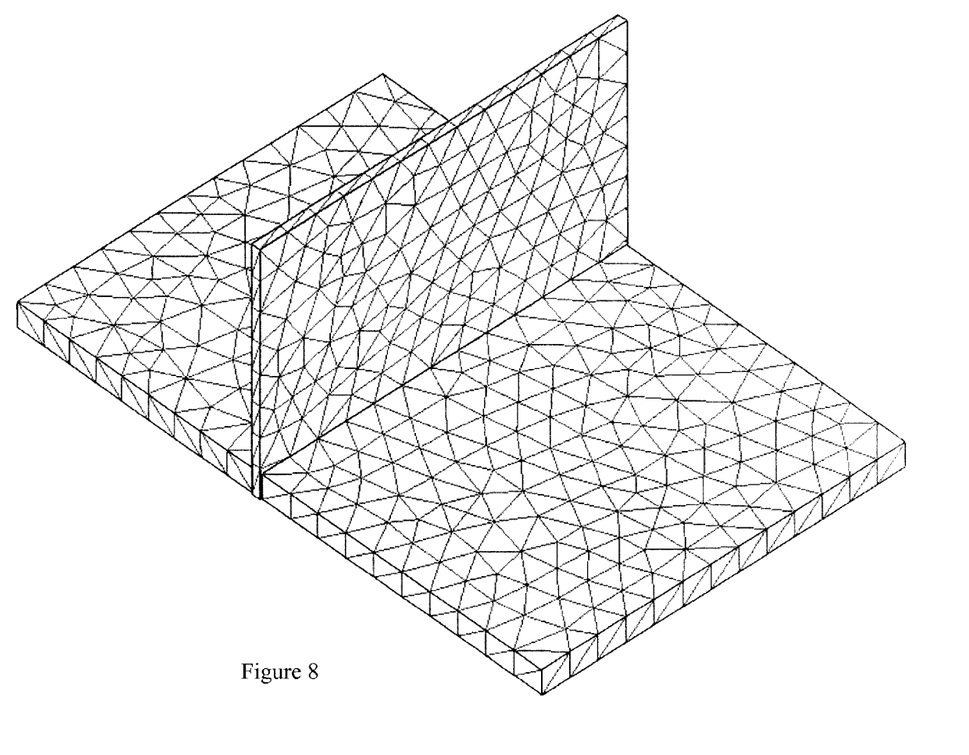
FIG. 8 is a view of a model of a T-shaped part comprising meshed representations of first and second generally opposed surfaces of the part.

Start from a solid model, utilize the outer surfaces which define the three dimensional object to create a computational domain rather than a midplane surface. Mesh the outer surface using triangular or quadrilateral element. The computational domain would comprise meshed representations of first and second generally opposed surfaces of a part. For example, the mesh or computational domain of a T-shape part is shown in FIG. 8.

Assignation of Thickness and Eccentricity: Matched and Unmatched Elements

Regard the first surface as the reference surface of the first half-thickness part and the second surface as the reference surface of the second half-thickness part. Elements of the two surfaces are matched, based on the ability to identify a thickness between such elements. Assign the thickness of these shell elements to be half of the distance between matched elements. The eccentricities of elements on the first and second surface are also determined, which are the half of the element thickness. The sign (positive or negative) of eccentricities of elements depends on the pre-defined rule of the chosen shell element formulations.

Preferably any unmatched elements of said first and second surfaces, being elements that could not be matched, are assigned thickness being the average of the thickness of adjacent matched elements where such adjacent matched element exist, or of adjacent unmatched elements where such adjacent matched elements do not exist and said adjacent unmatched elements have been assigned thickness. Then assign the eccentricity of these elements as the matched elements do. Thus, eventually all matched and unmatched elements of the first and second surfaces may be assigned thicknesses and eccentricity.

Each element of an edge surface, being a surface between said first and second surfaces, and adjacent to either of said first or second surface, is assigned a thickness between 0.01 and 100.0 times (and preferably ⅓) the thickness of the element of the first and second surface to which the element of the edge surface is adjacent.

Preferably each element of an edge surface not adjacent to said first or second surface is assigned a thickness being the average of the thicknesses of adjacent elements of said edge surface that have been assigned thicknesses.

To simulate the edge deformation characteristics of thin-walled parts, each element of an edge surface is assigned artificial orthotropic material properties. The major material axis orientation is along the part thickness direction. Young's Modulus parallel to the part thickness direction (E1). can be assigned between 0.001 and 1000 (and preferably 15) times of the average Young's modulus of material of said first and second surface to which said element of said edge.surface is adjacent. Young's Modulus perpendicular to the part thickness direction (E2) can be assigned between 0.001 and 100 (and preferably 0.1) times of average Young's modulus of material of said first and second surface to which said element of said edge surface is adjacent.

Preferably each element of an edge surface not adjacent to said first or second surface is assigned Young's Modulus parallel to and perpendicular to the part thickness direction (E1) being the average of Young's Modulus parallel to the part thickness direction and the average of Young's Modulus perpendicular to the part thickness direction of adjacent elements of said edge surface that have been assigned material properties respectively.

The eccentricity for each element of the edge surface is zero.

Matching of Nodes to Points on Surface

Figure 9:
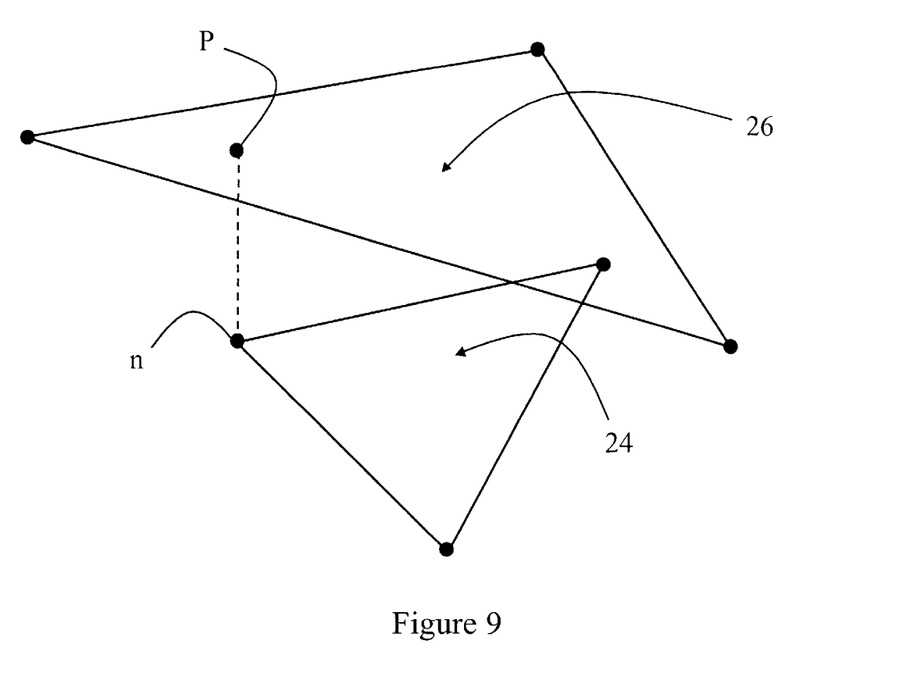
FIG. 9 is a view of the matching of a node of an element of one surface of an object to an element of the opposite surface of the object according to the present invention.

Referring to FIG. 9, establish the matching relationship between the node n on said first surface (as illustrated, bottom surface 24) and the point P on the second generally opposed surface (as illustrated, top surface 26), based on the rule that the connecting line of the node n and point P is parallel to the normal of said first surface 24 at the node n or the normal of said second surface 26 at the point P or some kind of average vector of these two normals. The point P is generally within a particular element, but could be a node or on the side of a element on said second surface. The point P is regarded as the matching point of that node n. The element in which the point P is located is easily determined as well and regarded as the matching element of the node. If the point P is shared by several elements, one of these several elements is picked as the matching element. In this embodiment, the element of the smallest area is picked as the matching element.

Establishment of constraint equations between degrees of freedom of a node n and Degrees of freedom of its matching element e In both Kirchhoff and Mindlin-Reissner plate theories, the assumption that the normals to the midsurface before deformation remain straight is applicable. As described above, the elements of said first surface represents the first half-thickness part, and the elements of said second surface represents the second half-thickness part. To make the first half-thickness part and the second half-thickness part bond together so that they can bear loading as a unity, the above assumption must be enforced between the deformation of said first surface mesh and said second surface mesh. Numerically the degrees of freedom of nodes on said first surface should be related to the degrees of freedom of nodes on said second surface.

Figure 10:
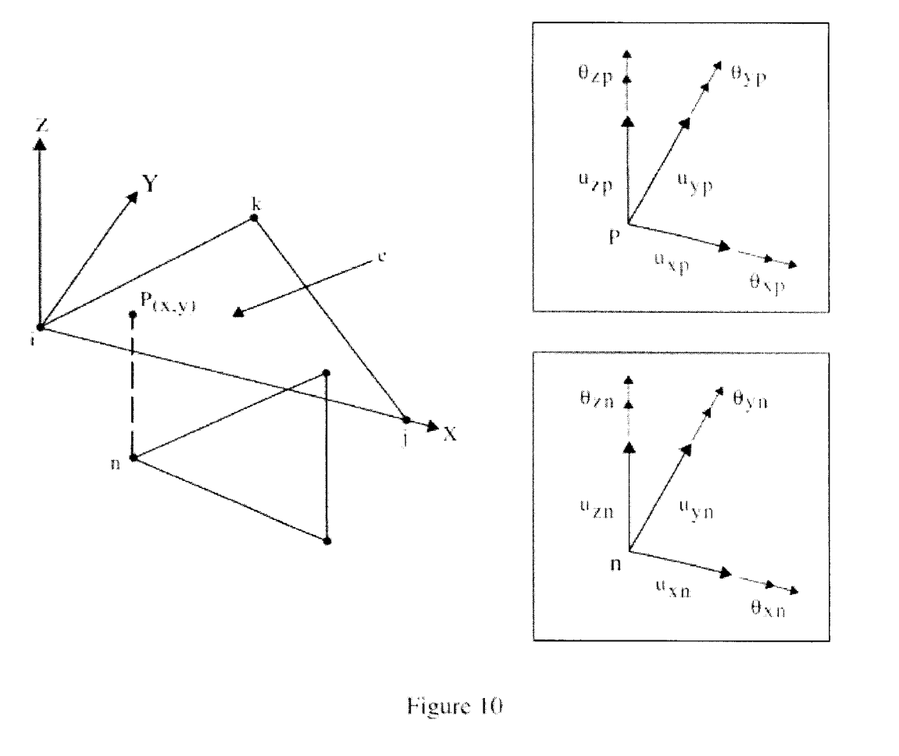
FIG. 10 is a view of the local coordinate system of the matching element.

Referring to FIG. 10, since a node n has its matching point P on the opposed surface (element e), their connection line is exactly or very closely parallel to the normal of the midsurface. Based on the assumption that the normals to the midsurface before deformation remain straight, all or some of the degrees of freedom (translational displacements and rotations) of the node n can be expressed as linear functions of the displacement variables (translational displacements and rotations) at the matching point P in the local coordinate system of the matching element.

Based on the position of the matching point in the matching element and the displacement interpolation function of the chosen shell element, the displacement variables (transitional displacements and rotations) at the matching point can be expressed as linear functions of the degrees of freedom of nodes of the matching element in the local coordinate system of the matching element (FIG. 10).

Therefore, according to the above two relationships, all or part of degrees of freedom of the node can be expressed as linear functions of the degrees of freedom of nodes of the matching element. These relationships are the typical multi-point constraint (MPC) equations which can be incorporated in the global finite element matrix equations. The algorithms for dealing with MPC equations are well established and available in various published texts on finite element analysis. The transformation method, Lagrange multiplier and penalty function methods of implementing multi point constraints are all applicable to the current problem.

A triangular facet shell element is used in this embodiment. This is a 3-noded element with 18 degrees of freedom (6 at each node). The element is constructed by superimposing the local membrane formulation of Bergan and Felippa (*Computer Methods in Applied Mechanics and Engineering*, 50 (1985) 25) with the bending formulation of Batoz and Lardeur (*International Journal of Numerical Methods in Engineering*, 28 (1989) 533) and transforming the combined equations to the global coordinate system.

The drilling rotation degree of freedom about local reference surface normal is used in the membrane formulation, which is defined in the local element system by:

$$\theta_z = \frac{1}{2}\left[\frac{\partial u_y}{\partial x} - \frac{\partial u_x}{\partial y}\right] \quad (1)$$

Next the relationship between the degrees of freedoms of node n and those of its matching element e is defined (see FIG. 10). Based on the assumption that the normals to the midsurface before deformation remain straight after deformation which are used in both Kirchhoff and Mindlin plate theories, there are the following relationships between the degrees of freedom of node n and displacements and rotations of its matching point p.

$$u_{xn} = u_{xp} - \theta_{yp} h$$

$$u_{yn} = u_{yp} + \theta_{xp} h$$

$$u_{zn} = u_{zp}$$

$$\theta_{xn} = \theta_{xp}$$

$$\theta_{yn} = \theta_{yp} \quad (2)$$

$$\theta_{zn} = \theta_{zp} + \frac{h}{2}\left[\frac{\partial \theta_{xp}}{\partial x} + \frac{\partial \theta_{yp}}{\partial y}\right]$$

where 'h' is the distance between node n and its matching point p; and $u_{xn}$, $u_{yn}$, $u_{xn}$, $\theta_{xn}$, $\theta_{yn}$ and $\theta_{zn}$ are the local degrees of freedom at node n referred to the local element coordinate system of its matching element e; $u_{xp}$, $u_{yp}$, $u_{zp}$, $\theta_{xp}$, $\theta_{yp}$ and $\theta_{zp}$ are the displacements and rotations at point p and are also in the local element coordinate system of the matching element e.

It should be noted that the last relationship in equation (2) defining $\theta_{zn}$ is obtained using equation (1).

Equation (2) can be rewritten in the matrix form:

$$\underline{U}_n = \underline{A}_1 \underline{U}_p + \underline{A}_2 \underline{D}_\theta \quad (3)$$

where $\underline{U}_n = (u_{xn}, u_{yn}, u_{zn}, \theta_{xn}, \theta_{yn}, \theta_{zn})^T$, $\underline{U}_p = (u_{xp}, u_{yp}, u_{zp}, \theta_{xp}, \theta_{yp}, \theta_{zp})^T$, $$\underline{D}_\theta = \left(\frac{\partial \theta_{xp}}{\partial x}, \frac{\partial \theta_{yp}}{\partial y}\right)^T$$

and $\underline{A}_1$ and $\underline{A}_2$ are matrices that depend on the distance between node n and point p.

From the element formulation, the displacements and rotations at point p can be obtained by shape function interpolations. That is, $$\underline{U}_p = \underline{B}_1 \underline{\alpha}_e \quad (4)$$

in which:

$$\underline{\alpha}_e = (u_{xi}, u_{yi}, u_{zi}, \theta_{xi}, \theta_{yi}, \theta_{zi}, u_{xj}, u_{yj}, u_{zj}, \theta_{xj}, \theta_{yj}, \theta_{zj}, u_{xk}, u_{yk}, u_{zk}, \theta_{xk}, \theta_{yk}, \theta_{zk})$$

and $\underline{B}_1$ is a matrix whose values depend on the local coordinates of the point p.

Based on equation (4), $\underline{D}_\theta$ can be expressed as:

$$\underline{D}_\theta = \underline{B}_2 \underline{\alpha}_e \quad (5)$$

where $\underline{B}_2$ is a matrix whose values also depend on the local coordinates of the point p.

Combining equations (3), (4) and (5), the relationship between the degrees of freedom of the node n and degrees of freedoms of its matching element e is obtained:

$$\underline{U}_n = (\underline{A}_1 \underline{B}_1 + \underline{A}_2 \underline{B}_2) \underline{\alpha}_e \quad (6)$$

These constraint equations can be transformed to the global coordinate system thereby providing the final constraint equations between degrees of freedom of the node n and degrees of freedom of its matching element e in the global coordinate system.

Specification of External and Internal Loading and Boundary Conditions

The loading, constraint conditions and material property for the mesh are then specified. The loading condition includes any kinds of usual external and/or internal loads. The acting loads could be defined on points, edges, patches or volumes. The loading type could be static or dynamic, actual forces or thermal loading, residual stress/strain and initial stress/strain. The material could be isotropic or anisotropic.

Perform Analysis and Improve Design A finite element analysis of the structure of the object is then performed to obtain the displacement, strain and stress.

Results from the analysis will include stresses, strains, deflections and the deformed shape of the component. The invention can therefore be used to determine any of the usual results of structural analysis, including, for example:

1. the material is subject to too high a stress or strain level;
2. the component is sufficiently rigid to perform its intended design function; and
3. the deflected part impacts on other parts in an assembly.

By considering the results of the analysis, the user can modify the part geometry or material type to improve the performance of the part under loading conditions.

This preferred method may be used for warpage analysis of injection molded parts. Firstly, an in-mold residual stress distribution, as an example of an internal load, is determined from flow and cooling analysis software, such as that provided by Moldflow Corporation. The term "in-mold residual stress distribution" refers to the stress distribution in the part due to processing while the part is in the mold and just prior to ejection. This distribution may be used as input into the apparatus described here to produce the deflected shape of the component and the resulting residual stress distribution. A user of the preferred method of the present invention can then modify part geometry, process conditions or material type and perform a further analysis to check that the design has improved.

Alternatively, residual stress, residual strain or thermal loads may be obtained from other commercial software such that, when used in a structural analysis, the deformed shape can be calculated thereby accounting for the effects of processing, the part geometry and material type.

For the warpage analysis of injection moulding parts, a thickness change should be forced by modifying the special constraint equation (2) between the local deflection ($u_{zn}$) of a node of the first surface and the local deflection ($u_{zp}$) of the matching point of the opposed surface, so that:

$$u_{zn}=u_{zp}+\phi h$$

where $\phi$ represents the thickness shrinkage, the value of which is based on the in-mold residual stress level in the part. It should be noted that this residual stress level is the in-plane residual stress.

In this preferred embodiment, principal initial strains are calculated from the in-plane, in-mold residual stresses for all elements except the elements on the edge surface, and then $\phi$ is obtained by simply averaging these principal initial strains. The thickness shrinkage $\phi$ is therefore the average in-plane strain resulting from the in-plane stress distribution just prior to the ejection of the part.

The in-mold residual stress results on elements of an edge surface from flow and cooling analysis are discarded. Special artificial in-mold residual stresses are assigned in these edge elements to avoid unrealistic warpage due to edge elements' constraints of the part deformation.

For the edge elements such as $e_1$ in FIG. 11, which shares a side ab with the element $e_2$ on one of the first or second surfaces, their initial stresses are calculated as below: firstly the strain along the side ab is calculated based on the in-mold residual stresses of element $e_2$, and secondly this strain is taken to the element $e_1$ as its principal strain perpendicular to the part thickness direction, and thirdly the thickness shrinkage strain $\phi$ is taken to the element e1 as its principal strain parallel to the part thickness direction. Finally from these two principal strains, the equivalent in-mold residual stresses can be derived for the edge element $e_1$.

Figure 11:
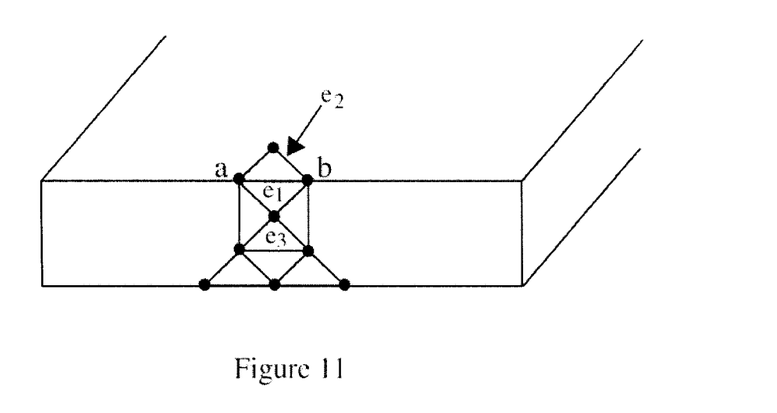
FIG. 11 is a view of edge elements of the model of an object according to the present invention.

For the edge elements such as $e_3$ in FIG. 11, which do not share any sides with any elements on the first or second surfaces, their in-mold residual stresses are assigned to be the average in-mold residual stresses of adjacent edge elements of said edge surface that have been assigned artificial in-mold residual stresses.

CONCLUSION

The essential concept of the present invention is thus the use of a surface mesh on a solid model to perform structural analysis. The invention is ideally suited to thin-walled structures. It is also particularly useful if there are some small chunky regions in the thin walled structure and the stress/strain state is not important in these chunky regions. The analysis can be used for static and dynamic structural analysis including linear, nonlinear, buckling and modal frequency analysis. Many different types of loading may be used. Results from the analysis comprise: stresses, strains, deformation of the part and deflections in the global coordinate system.

This invention can also be used for warpage analysis of injection-molding parts. When used for warpage analysis the results are as for the case of structural analysis (stresses, strains, deformation of the part and deflections in the global coordinate system) but the deformed shape is due to the residual stresses developed during the injection molding process.

There is no special limitation for loading and material type as there is in the boundary element method. A solid model can be input in several file formats such as STL, IGES, ACIS, PARASOLID and so on. Indeed it is only necessary that a surface mesh be produced on the part model to enable use of the method.

In view of the above, the method and apparatus of the invention is particularly suitable for analysis of injection molded components in which the material properties are affected by processing. In this regard the method disclosed in this application may be used to perform structural analysis (linear or nonlinear) on an injection molded component in which material properties are orthotropic. Such analysis can interface with other forms of analysis, such as supplied by Moldflow Corporation, that can predict the mechanical properties of injection molded material. The variation in mechanical properties may result from molecular orientation, crystalline morphology or the addition of short fiber reinforcement.

The method disclosed in the present invention may also be used to determine the warped shape of injection molded components made from polymeric, metal filled, ceramic filled or metal materials. Owing to processing effects, injection molded materials may shrink by different amounts in different directions. The present invention may be interfaced with other analysis products that can predict the residual stress distribution in injection molded parts. This residual stress distribution is determined by considering variation in the material's thermo-mechanical properties due to processing. By using this stress distribution as the loading for a structural analysis, the warped shape and final shrinkage of the component can be determined. If such analysis indicates excessive levels of warpage, the component geometry, material type or processing conditions can be changed. Another analysis can be performed and so on until an improvement is noted.

Modifications within the spirit and scope of the invention may readily be effected by a person skilled in the art. It is to be understood, therefore, that this invention is not limited to the particular embodiments described by way of example hereinabove.

The claims defining the invention are as follows:

1. A method for analysing the structural response of an object having an outer surface comprising a plurality of surface portions, involving:

forming a three dimensional model of said object, said model comprising a surface mesh representative of said outer surface and comprising a plurality of eccentric shell elements, wherein each of said elements is defined by a plurality of nodes on said surface and each of said nodes has one or more degrees of freedom;

assigning to each of said elements a thickness indicative of half of the thickness of said object at said respective element;

defining, for each of said elements, a reference surface that includes the nodes of said respective element and that is coincident with said surface mesh at said respective element;

for a pair of opposed portions of said surface, establishing a constraining relationship between said degrees of freedom of each of said nodes on the first of said opposed portions and said degrees of freedom of one or more of the nodes on the second of said opposed portions;

performing a finite element structural analysis of said object; and outputting one or more results of said structural analysis.

2. A method as claimed in claim 1, wherein some or all of said surface portions are not planar.

3. A method as claimed in claim 1, wherein, for each of said nodes of said first of said opposed portions, the method includes establishing a constraining relationship between said degrees of freedom of said node and the degrees of freedom of an opposite node, being that node on the second of said pair of opposed portions opposite said node, when said opposite node exists, or between said degrees of freedom of said node and said degrees of freedom of the nodes of an opposite element, being that element of said opposed portion opposite said node, when opposite node does not exist.

4. A method as claimed in claim 1, wherein said thickness indicative of half of the thickness of said object is derived from the actual thickness of said object if it is possible to define such a thickness and, where it is not possible to define the actual thickness of said object, the thickness of said elements is taken to be the thickness of adjacent elements, or proportional to the thickness of adjacent elements.

5. A method as claimed in claim 1, including selecting said pair of opposed portions to be those opposed portions of said surface of said object between which said object is thinnest.

6. A method as claimed in claim 1, wherein said mesh comprises a lattice of triangles, quadrilaterals or other simple shapes, whether planar or curved.

7. A method as claimed in claim 1, for analysing the effects of internal stresses or loads induced in said object during its manufacture.

8. A method as claimed in claim 7, for analysing deformation or warping of said object caused by said internal loads or stresses.

9. A method as claimed in claim 1, wherein said method includes creating said surface mesh by creating or importing a stereolithography representation of said object.

10. A method as claimed in claim 1, including creating said surface mesh by:

creating or importing a stereolithography representation of said object; and improving said stereolithography representation.

11. A method as claimed in claim 1, wherein said method is performed by a computer running a computer program encoding said method for analysing the structural response of an object.

12. A method of manufacturing an object, including analysing the structural response of said object according to the method claimed in claim 1.

13. An object or part of an object manufactured according to the method of claim 12.

14. A computer provided with or running a computer program encoding the method for method for analysing the structural response of an object according to claim 1.

15. A computer readable storage medium provided with a computer program embodying the method for method for analysing the structural response of an object according to claim 1.

16. An apparatus for analysing the structure of an object having an outer surface comprising a plurality of surface portions, having:

modelling means for forming a three dimensional model of said object, said model comprising a surface mesh representative of said outer surface and comprising a plurality of eccentric shell elements, wherein each of said elements is defined by a plurality of nodes on said surface and each of said nodes has one or more degrees of freedom;

means for assigning to each of said elements a thickness indicative of half of the thickness of said object at said respective element;

means for defining, for each of said elements, a reference surface that includes the nodes of said respective element and that is coincident with said surface mesh at said respective element;

constraining means for establishing, for a pair of opposed portions of said surface, a constraining relationship between said degrees of freedom of each of said nodes on the first of said opposed portions and said degrees of freedom of one or more of the nodes on the second of said opposed portions;

analysis means for performing a finite element structural analysis of said object; and outputting means for outputting one or more results of said structural analysis.

17. An apparatus as claimed in claim 16, wherein each of said means comprises computer program products or portions.

18. An apparatus as claimed in claim 17, including a computer for executing such computer program portions.

19. An apparatus as claimed in claim 16, wherein said results of said analysis include data or images indicating the expected deformation and stress state of the object under some internal or external load.

20. An apparatus as claimed in claim 16, wherein said constraining means is operable, for each of said nodes of said first of said opposed portions, to establish a constraining relationship between said degrees of freedom of said node and the degrees of freedom of an opposite node, being that node on the second of said pair of opposed portions opposite said node, when said opposite node exists, or between said degrees of freedom of said node and said degrees of freedom of the nodes of an opposite element, being that element of said opposed portion opposite said node, when opposite node does not exist.

21. An apparatus as claimed in claim 16, wherein said means for assigning to each of said elements a thickness is operable to employ a thickness indicative of the total thickness of said object at said respective element the actual total thickness of said object if it is possible to define such a thickness, and—where it is not possible to define the thickness of said object—to assign to said elements a thickness equal to the thickness of adjacent elements, or proportional to the thickness of adjacent elements.

22. An apparatus as claimed in claim 16, wherein the apparatus is configured to select as said pair of opposed portions those opposed portions of said surface of said object between which said object is thinnest.

23. An apparatus as claimed in claim 16, wherein said mesh comprises a lattice of triangles, quadrilaterals or other simple shapes, whether planar or curved.

24. An apparatus as claimed in claim 16, wherein said analysis means is operable or configured to analyze the effects of internal stresses or loads induced in the object during its manufacture.

* * * * *